(12) United States Patent
Shimizu

(10) Patent No.: US 8,717,286 B2
(45) Date of Patent: May 6, 2014

(54) INFORMATION PROCESSING APPARATUS, PROCESSING METHOD THEREOF, AND COMPUTER-READABLE STORAGE MEDIUM

(75) Inventor: Tomoyuki Shimizu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 420 days.

(21) Appl. No.: 12/609,712

(22) Filed: Oct. 30, 2009

(65) Prior Publication Data

US 2010/0123657 A1    May 20, 2010

(30) Foreign Application Priority Data

Nov. 20, 2008    (JP) ................. 2008-297093

(51) Int. Cl.
*G09G 5/00*       (2006.01)
*G09G 5/08*       (2006.01)
*G06F 3/033*      (2013.01)
*G06F 3/048*      (2013.01)

(52) U.S. Cl.
USPC ............ 345/156; 345/158; 345/169; 715/835

(58) Field of Classification Search
USPC .................................. 345/156–172
See application file for complete search history.

(56) References Cited

U.S. PATENT DOCUMENTS

| | | | |
|---|---|---|---|
| 6,301,586 B1 * | 10/2001 | Yang et al. ............. | 1/1 |
| 7,508,374 B2 | 3/2009 | Tsunoda | |
| 2001/0013877 A1 * | 8/2001 | Fujino ........................ | 345/835 |
| 2002/0048349 A1 * | 4/2002 | Bixler et al. ............. | 379/67.1 |
| 2003/0030823 A1 * | 2/2003 | Kruse ......................... | 358/1.6 |
| 2003/0085870 A1 * | 5/2003 | Hinckley ................... | 345/156 |
| 2003/0220920 A1 * | 11/2003 | Lake et al. ................. | 707/6 |
| 2005/0140646 A1 * | 6/2005 | Nozawa ..................... | 345/156 |
| 2005/0212767 A1 * | 9/2005 | Marvit et al. ............. | 345/158 |
| 2006/0103631 A1 * | 5/2006 | Mashima et al. ......... | 345/158 |
| 2006/0187204 A1 * | 8/2006 | Yi et al. .................... | 345/158 |
| 2007/0292048 A1 * | 12/2007 | Choe et al. ................ | 382/286 |
| 2008/0120534 A1 * | 5/2008 | Moore ....................... | 715/243 |
| 2009/0046538 A1 * | 2/2009 | Breed et al. ............... | 367/93 |
| 2010/0058363 A1 * | 3/2010 | Brun et al. ................. | 719/328 |
| 2010/0070926 A1 * | 3/2010 | Abanami et al. .......... | 715/835 |

FOREIGN PATENT DOCUMENTS

| | | |
|---|---|---|
| JP | 2002-149616 | 5/2002 |
| JP | 2005-025170 | 1/2005 |
| JP | 2008-234055 A | 10/2008 |

OTHER PUBLICATIONS

Microsoft PowerPoint 2007: Link: http://office.microsoft.com/en-us/powerpoint-help/animate-text-or-objects-HA010021497.aspx?CTT=1#BM3.*

The above reference was cited in a Jul. 13, 2012 Japanese Office Action, which is enclosed without an English Translation, that issued in Japanese Patent Application No. 2008-297093.

* cited by examiner

*Primary Examiner* — Alexander S Beck
*Assistant Examiner* — Nguyen H Truong
(74) *Attorney, Agent, or Firm* — Cowan, Liebowitz & Latman, P.C.

(57) ABSTRACT

An information processing apparatus executes a variety of processing operations in accordance with a user's operation detected by an operation detection device. The apparatus generates a data set from a data group in accordance with a predetermined condition. The apparatus determines the content of processing corresponding to the motion detected by the operation detection device. The apparatus adjusts the data set by increasing or decreasing data included in the data set generated, based on the determined processing.

16 Claims, 8 Drawing Sheets

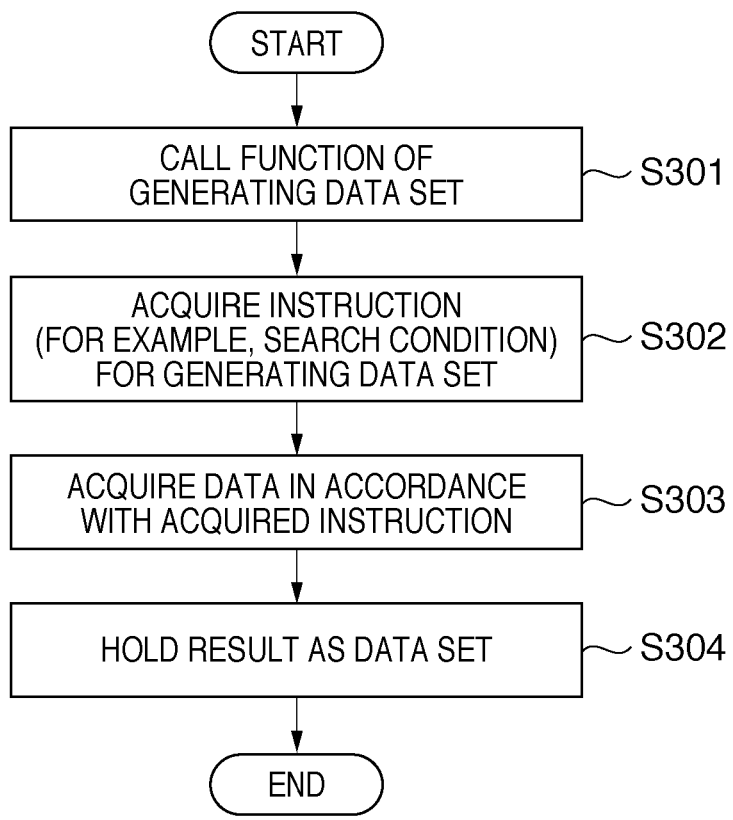
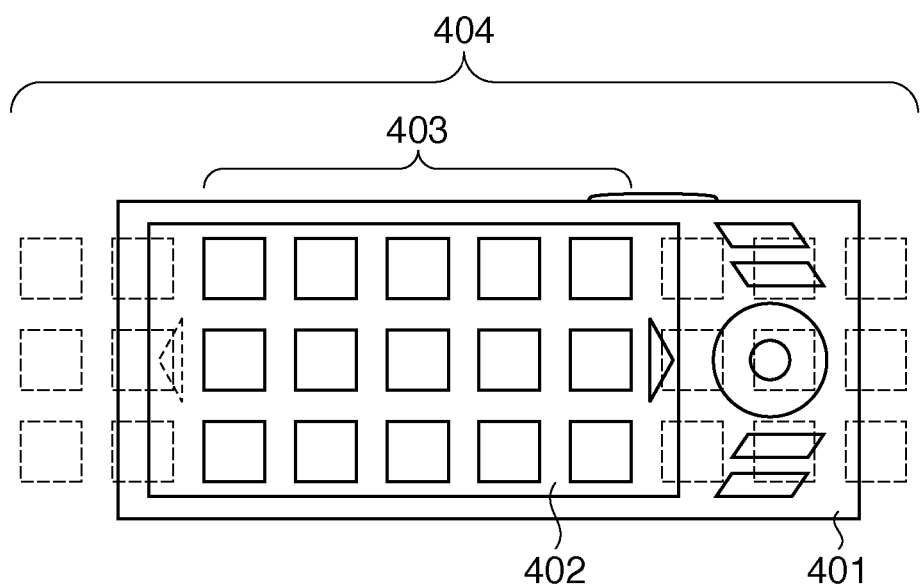

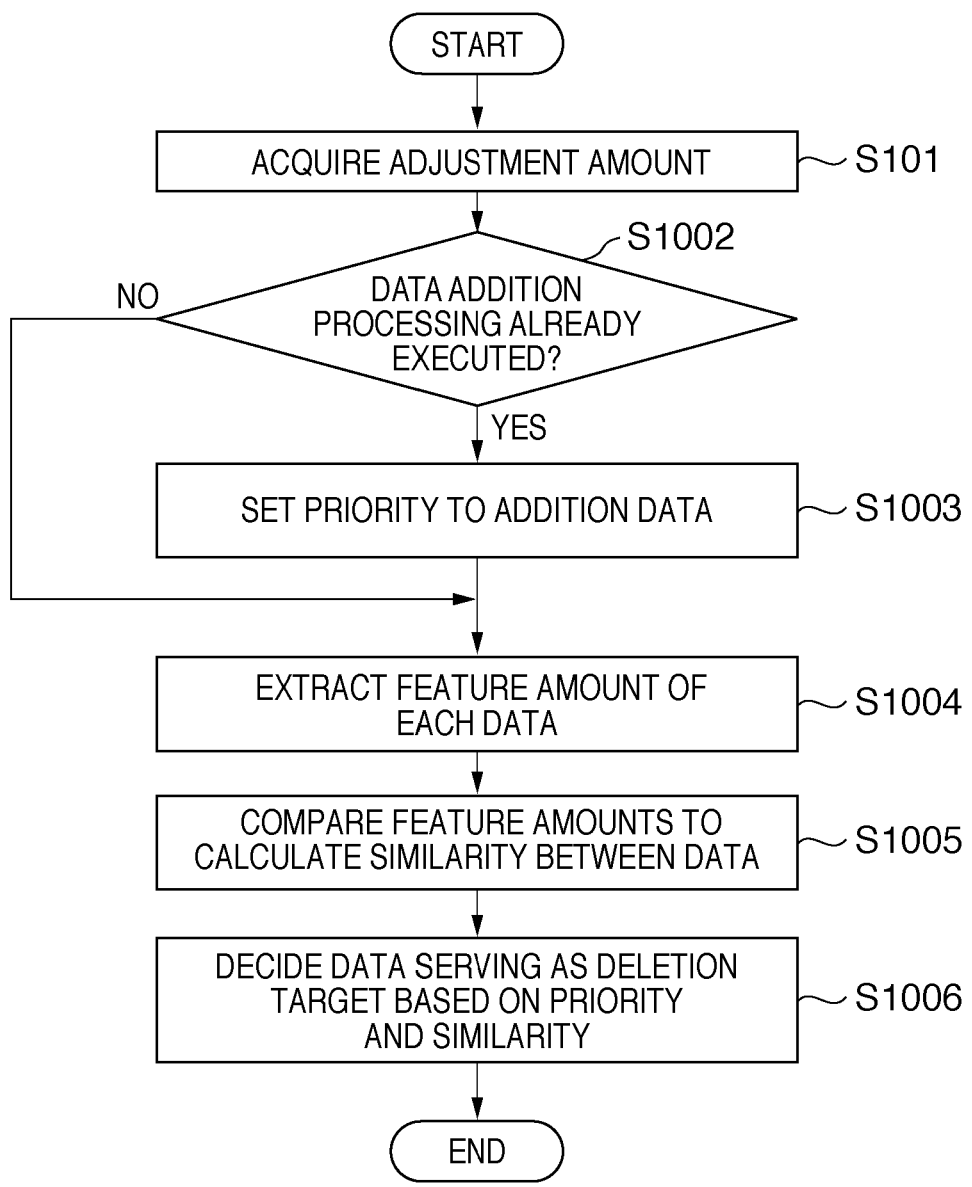

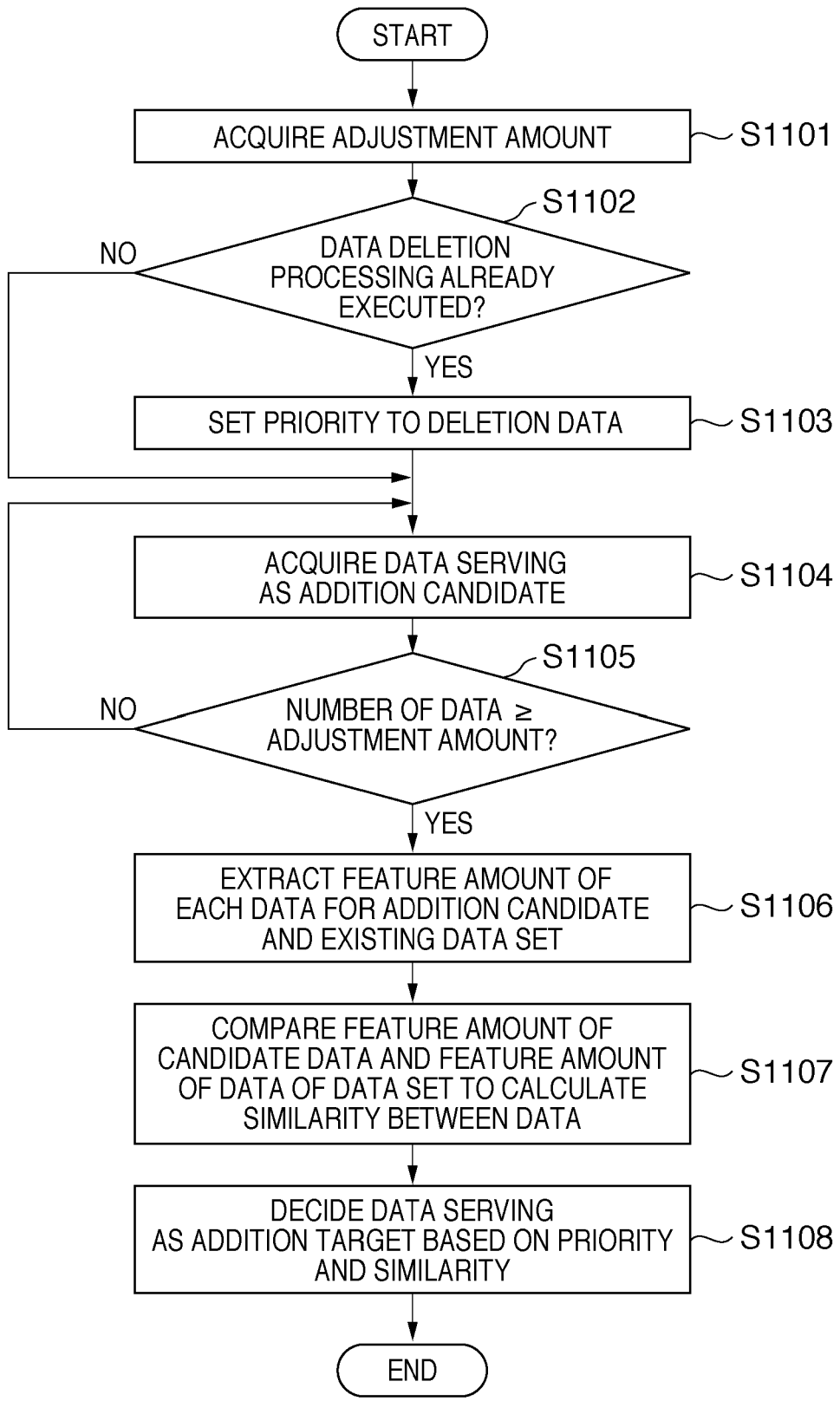

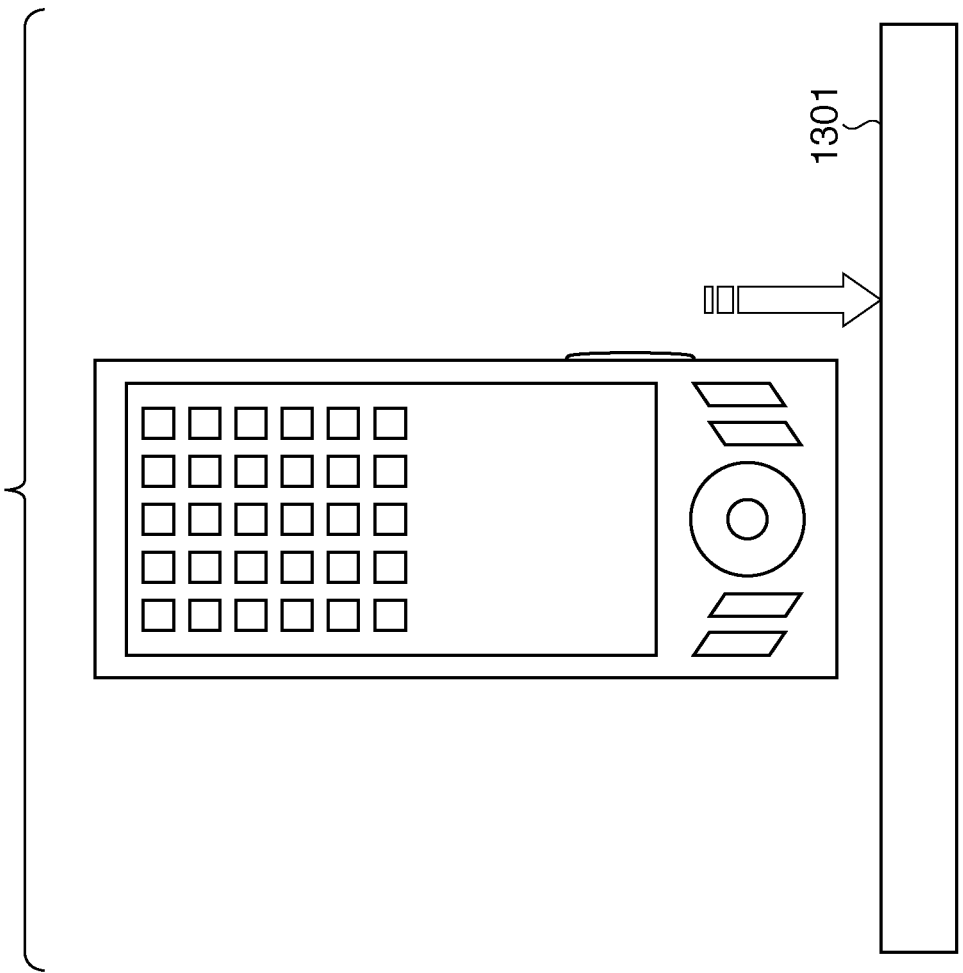
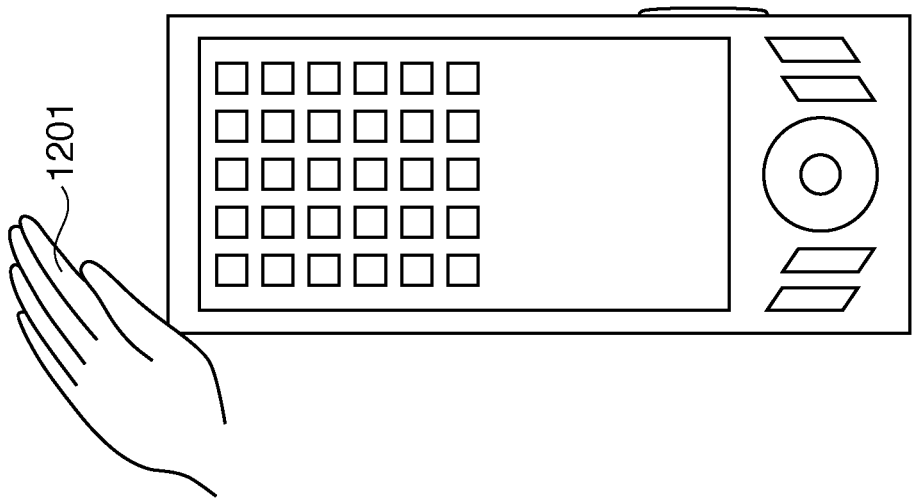

INFORMATION PROCESSING APPARATUS, PROCESSING METHOD THEREOF, AND COMPUTER-READABLE STORAGE MEDIUM

BACKGROUND OF THE INVENTION

1. Field of the Invention

The present invention relates to an information processing apparatus, a processing method of the information processing apparatus, and a computer-readable storage medium.

2. Description of the Related Art

In recent years, advanced, multifunctional devices are very familiar. To manipulate these devices, users must master cumbersome complicated button manipulations and memorize a method of calling necessary functions from a large volume of menus. It is inconvenient for many users to perform such manipulations.

Some game machines and portable music players have interfaces for receiving users' intuitive input operations such as touching, shaking, and inclining. Since the intuitive operations are associated with the functions, even a user who is not good at the operation of a conventional interface can easily learn the manipulations.

An example of the above technique is a technique for enlarging data when a portable device is inclined backward during display of the data and reducing it when the device is inclined forward (Japanese Patent Laid-Open No. 2005-025170). When the device moves as if it were coming closer to the data, the data is enlarged, and when the device moves as if it were separating from the data, the data is reduced. This makes it possible to perform an intuitive manipulation. Another technique is also known wherein the user can select data to be displayed without any button manipulation by making the inclining or shaking operation correspond to processing (Japanese Patent Laid-Open No. 2002-149616).

For example, with a device such as a digital camera or portable music player, the user often creates a data set by designating a specific condition in order to achieve browsing and playback. The resultant data set can rarely be the one he wants from the beginning. For example, when the user creates a data set such as slide show images and music data play list, he may often feel that he wants more music tunes or less music tunes. Generally, the user repeatedly changes the condition setting by trial and error and adjusts the condition setting until a desired data set is obtained.

It is not easy for the user to set such a condition and repeats manipulations to obtain a desired condition. Demand has arisen for achieving a function of adjusting a data set by an intuitive manipulation.

SUMMARY OF THE INVENTION

The present invention provides an information processing apparatus, its processing method, and a computer-readable storage medium capable of obtaining a desired data set by an intuitive manipulation.

According to a first aspect of the present invention, there is provided an information processing apparatus which executes a variety of processing operations in accordance with a user's operation detected by an operation detection device, comprising: a generation unit configured to generates a data set from a data group in accordance with a predetermined condition; a determination unit configured to determine a content of processing corresponding to a motion detected by the operation detection device; and an adjustment unit configured to perform adjustment of the data set by increasing or decreasing the data included in the data set generated by the generation unit, based on the content of processing determined by the determination unit.

According to a second aspect of the present invention, there is provided a processing method for an information processing apparatus which executes a variety of processing operations in accordance with a user's operation detected by an operation detection device, comprising: a generation step of generating a data set from a data group in accordance with a predetermined condition; a determination step of determining a content of processing corresponding to a motion detected by the operation detection device; and an adjustment step of performing adjustment of the data set by increasing or decreasing the data included in the data set generated in the generation step, based on the content of processing determined in the determination step.

Further features of the present invention will become apparent from the following description of exemplary embodiments with reference to the attached drawings.

BRIEF DESCRIPTION OF THE DRAWINGS

FIG. 3 is a flowchart showing an example of a processing sequence for generating a data set;

FIG. 4 is a view showing an example of a display mode of an output device 106 in the information processing apparatus 100 shown in FIG. 1;

FIG. 10 is a flowchart showing an example of a processing sequence for deleting data from the data set;

FIG. 11 is a flowchart showing an example of a processing sequence for adding data to the data set;

FIG. 12 is a first view showing an example of a modification of the embodiment; and FIG. 13 is a second view showing the example of the modification of the embodiment.

DESCRIPTION OF THE EMBODIMENTS

A preferred embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
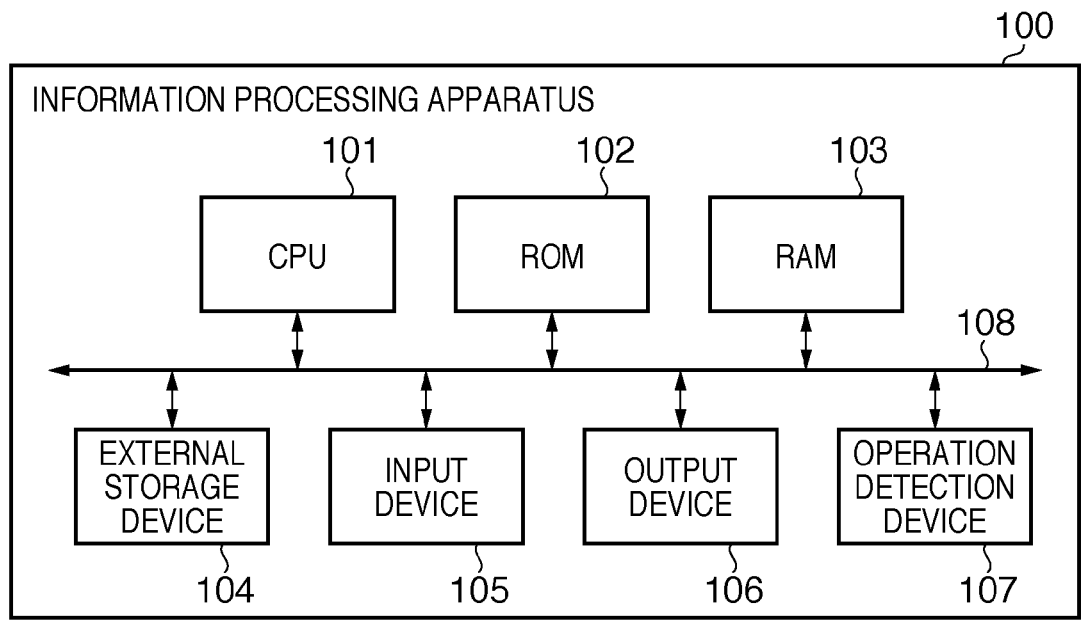
FIG. 1 is a block diagram showing an example of the hardware configuration of an information processing apparatus according to an embodiment of the present invention.

FIG. 1 is a block diagram showing an example of the hardware configuration of an information processing apparatus according to an embodiment of the present invention.

An information processing apparatus 100 executes a variety of processing operations in accordance with operations detected by an operation detection device 107. This embodiment will exemplify the information processing apparatus 100 as a digital camera (capturing both a still image and a moving image). As the information processing apparatus 100, a music player, cellular phone, information terminal, or game machine is available in addition to the digital camera.

A CPU (Central Processing Unit) 101 controls the information processing apparatus 100 as a whole. A ROM (Read Only Memory) 102 stores permanent programs and parameters. A RAM (Random Access Memory) 103 temporarily stores program codes (to be simply referred to as programs hereinafter) and data supplied from an external storage device and sensors. An external storage device 104 stores a variety of data in addition to an OS (Operating System). An example of the external storage device 104 is a hard disk or memory card fixed in the device; or an optical disk such as a flexible disk (FD) or CD (Compact Disc), a magnetic or optical card, IC card, or memory card detachable from the device. In this embodiment, the programs are stored in the external memory device 104. However, the programs may be stored in the ROM 102.

An input device 105 receives an input instruction from a user. The input device 105 is implemented by a button, keyboard, pointing device, microphone, or the like. An output device 106 outputs data, data set, or its icon or thumbnail image held in the information processing apparatus 100. The output device 106 is implemented by, for example, an LCD display or loudspeaker. The operation detection device 107 detects information about motion via a sensor. The operation detection device 107 suffices to detect an operation and its degree, but the detection method (e.g., a sensor) is not limited to a specific one. For example, to detect the shaking motion of a device in a predetermined direction, a general acceleration sensor is used to estimate the shaking motion in accordance with a change in acceleration of the device. To detect that the user strikes a device or makes it contact something, impact and vibration sensors or sound sensor is used to estimate the above operations. A plurality of sensors may be combined to form the operation detection device 107. The operation detection device 107 of this embodiment detects the motion of the information processing apparatus 100 itself. However, the detection target is not limited to this. For example, a control device for receiving an intuitive input operation of a user may be arranged, and the operation detection device 107 may be arranged on the control device. In this case, the input operation of the user, that is, the information about the motion of the control device may be fed back to the information processing apparatus 100.

A system bus 108 communicably connects the units 101 to 107. An example of the arrangement of the information processing apparatus 100 has been described above.

Figure 2:
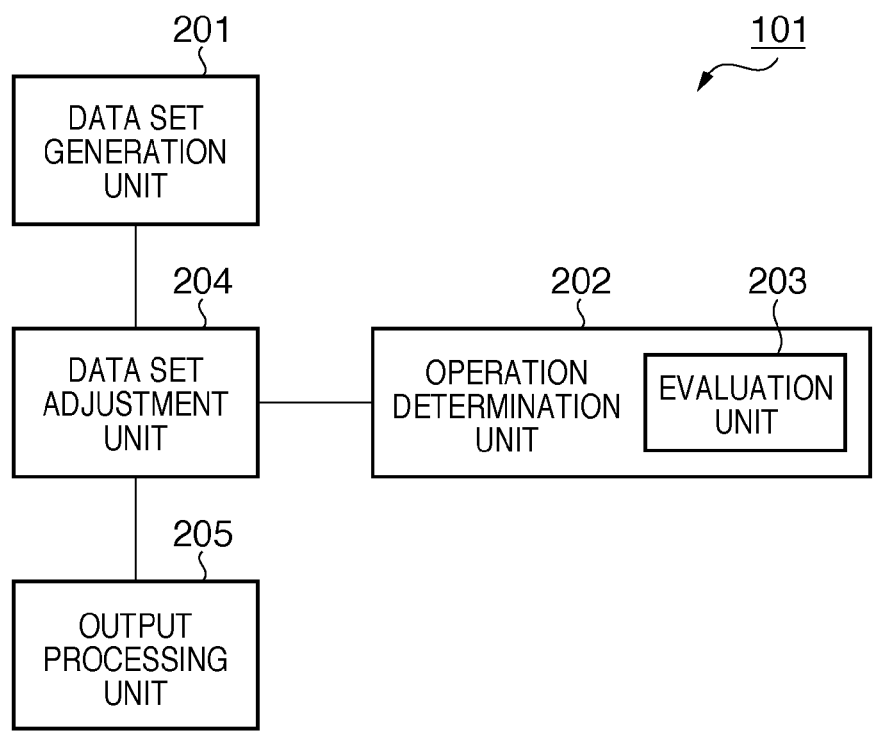
FIG. 2 is a block diagram showing an example of the functional arrangement of an information processing apparatus 100 shown in FIG. 1.

FIG. 2 is a block diagram showing an example of the functional arrangement of the information processing apparatus 100 shown in FIG. 1. Some or all the processing functions are implemented by causing the CPU 101 to execute the programs stored in the external storage device 104. Some or all the processing functions may be implemented by hardware.

The CPU 101 implements, as functional blocks, a data set generation unit 201, operation determination unit 202, evaluation unit 203, data set adjustment unit 204, and output processing unit 205.

The data set generation unit 201 generates a data set from a data group in accordance with a predetermined condition. The data set generation unit 201 receives a data set generation instruction and a search condition, acquires data matching the instruction from the external storage device 104, and generates the data set. This instruction may be explicitly supplied from the user or may be internally generated in accordance with a data acquisition policy for each function of the information processing apparatus 100. The former instruction is generated by inputting search conditions by the user. The latter instruction varies depending on the apparatus and function and is not limited to a specific one. For example, the internal instruction is generated when acquiring a data set to generate playback candidates at random or when acquiring a latest accessed data set from log information. In this embodiment, a condition used to generate a data set is held in association with the obtained data set.

The operation determination unit 202 determines the contents of processing corresponding to a motion based on the motion (the type and direction of the motion) detected by the operation detection device 107. The operation determination unit 202 of this embodiment determines the corresponding processing contents based on information representing which surface of the device is an upper surface and information representing that the user is shaking the device.

The evaluation unit 203 evaluates the degree (magnitude) of motion detected by the operation detection device 107. This evaluation is performed in accordance with a necessary granularity. For example, assume that a function assigned to the shaking motion is set in three levels. The evaluation unit 203 divides the width of possible detection values of the acceleration sensor into three ranges, which are evaluated as high, medium, and low levels. Note that the division method is not limited to a specific one. For example, the width may be divided using preset threshold values.

The data set adjustment unit 204 adjusts a data set serving as a target in accordance with an operation or the evaluation content of the motion of the operation. The data set adjustment unit 204 changes a degree of adjustment of data (e.g., the increasing or decreasing number of data) in accordance with the degree of motion evaluated by the evaluation unit 203. This embodiment will exemplify a case in which the data set adjustment unit 204 changes the number of data included in the generated data set. The adjustment method of the processing in the data set adjustment unit 204 changes depending on the generation condition of the data set and its generation purpose.

The output processing unit 205 outputs a variety of windows to the output device 106 to present the apparatus and processing statuses to the user. The output processing unit 205 outputs, for example, the process of data adjustment processing in the data set adjustment unit 204 in a recognizable form. An example of the functional configuration implemented by the CPU 101 has been described above.

An example of the operation of the information processing apparatus 100 shown in FIG. 1 will be described below. An example of a processing sequence for generating a data set will be described with reference to FIG. 3.

In step S301, the information processing apparatus 100 calls the function of generating a data set. As described above, according to this embodiment, since the information processing apparatus 100 is a digital camera, processing in step S301 is executed when a function (image browser function) of browsing a captured image, for example, is called. Upon calling the image browser function, the information processing apparatus 100 generally generates an image set desired by the user. The user browses the images generated by calling this function (in some case, a slide show form).

In step S302, the data set generation unit 201 of the information processing apparatus 100 receives an instruction (e.g., a search condition) for generating a data set. Image data browsing will be exemplified. To browse image data, the user often inputs a search condition. In this case, the information processing apparatus 100 acquires this search condition as an instruction. Note that the information processing apparatus 100 acquires an instruction such as a search condition via the input device 105.

In step S303, the data set generation unit 201 of the information processing apparatus 100 acquires data matching a predetermined condition from a data group in accordance with the instruction acquired in step S302. The information processing apparatus 100 then generates a data set. The apparatus 100 acquires data from, for example, the external storage device 104.

In step S304, the data set generation unit 201 of the information processing apparatus 100 holds the data set acquired in step S303. The RAM 103 holds this data. The data to be held is data prior to adjustment of the number of data or the like. Note that the method of holding data is not limited to a specific one. For example, the RAM 103 may hold the data substance or reference information to the substance.

An example of a display mode of the output device 106 in the information processing apparatus 100 shown in FIG. 1 will be described with reference to FIG. 4. FIG. 4 shows the display mode of the output device 106 at the end of step S304 in FIG. 3. Assume that the data set is generated to perform a slide show.

Reference numeral 401 denotes an information processing apparatus main body; and 402, a display (i.e., the output device 106) on the apparatus. In this example, part of the data set acquired by the search conditions, for example, "2007" and "Christmas" is displayed as thumbnail images.

The display 402 displays only part 403 of the entire data set 404. In practice, data which cannot be currently displayed are inclined in the data set. When the display time per image and an entire slide show time are taken into consideration, the user may want to reduce the number of images to be displayed. The current data set has the number of data larger than that the user wants. The number of data must be adjusted to the number of data the user wants.

Figure 5:
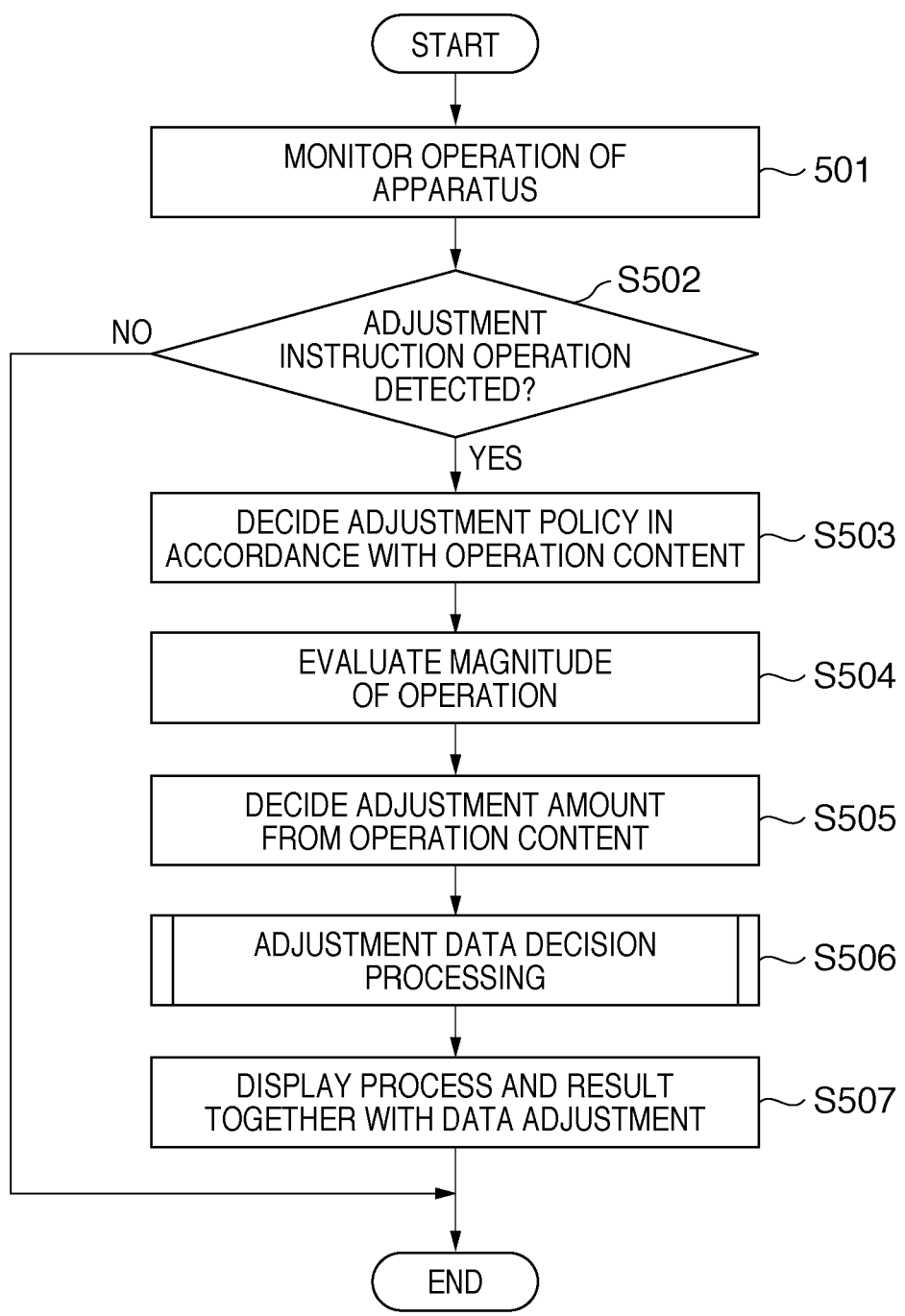
FIG. 5 is a flowchart showing an example of a processing sequence for adjusting the number of data.

An example of a processing sequence for adjusting the number of data will be described with reference to FIG. 5.

In step S501, the operation determination unit 202 of the information processing apparatus 100 monitors the motion until the operation detection device 107 detects the operation for moving the apparatus. Upon detection of the operation, the process advances to step S502.

In step S502, the operation determination unit 202 of the information processing apparatus 100 determines whether the detected operation is an operation (to be referred to as an adjustment instruction operation hereinafter) of instructing the adjustment of the data set. As a result of determination, when the adjustment instruction operation is detected, the process advances to step S503; otherwise, the process ends. Note that if the operation detection device 107 can detect a plurality of operations, processing in step S502 also determines which one of the operations is performed.

In step S503, the data set adjustment unit 204 of the information processing apparatus 100 determines the adjustment policy of the data set based on the operation determined in step S502. In this embodiment, the data set adjustment policy includes a policy for reducing data included in the current data set and a policy for increasing the number of data included in the current data set.

In step S504, the evaluation unit 203 in the information processing apparatus 100 evaluates the magnitude of the detected operation.

In step S505, the data set adjustment unit 204 of the information processing apparatus 100 decides the adjustment amount of the data based on the magnitude of the operation evaluated in step S504. Note that the adjustment amount of this embodiment indicates the number of data to be adjusted. The adjustment amount is calculated by a ratio of the number of data to be increased or reduced (to the entire data set). When the magnitudes of operations are evaluated by, for example, three levels, high level, medium level, and low levels, 10%, 5%, and 2% are assigned to the high level, medium level, and low level, respectively. The number of data corresponding to the percentage is defined as the adjustment amount. The method of calculating the adjustment amount is not limited to this method. For example, absolute numerical values (in this case, the number of data) may be calculated such that "large" is the number of data as 10, "medium" is the number of data as 5, and "small" is the number of data as 2.

In step S506, the data set adjustment unit 204 of the information processing apparatus 100 performs adjustment data decision processing. More specifically, the data set adjustment unit 204 decides the data serving as the adjustment targets based on the adjustment policy determined in step S503 and the adjustment amount decided in step S505. This processing will be described in detail later. For example, to reduce the number of data, data to be reduced are specified.

In step S507, the data set adjustment unit 204 of the information processing apparatus 100 performs data adjustment, at the same time, the output processing unit 205 outputs the adjustment process and result to the output device 106. Note that the output of this embodiment is the display on the display (the output device 106) of the apparatus. This feedback allows the user to recognize the magnitude of the operation. The user can change the magnitude of the operation and can perform the intended adjustment.

Figure 8:
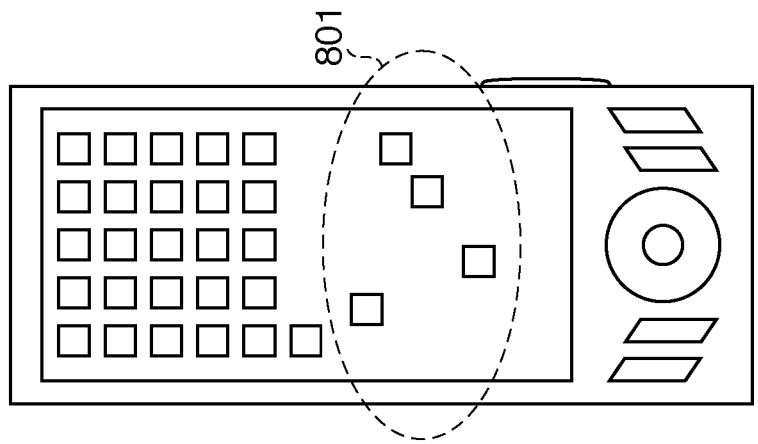
FIG. 8 is a third view showing the outline of processing for adjusting data.
Figure 6:
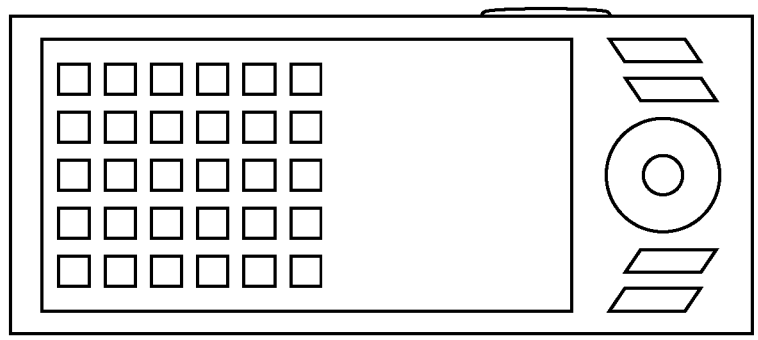
FIG. 6 is a first view showing the outline of processing for adjusting data.

An example of the outline of processing for adjusting the data set descried in FIG. 5 will be described with reference to FIGS. 6 to 8.

A case in which the data are reduced will be described below. FIG. 6 shows the display of an initial state. In this case, the respective data are displayed as thumbnail images so as to allow the user to understand the volume of the entire data set. Note that the display of the initial state is not limited to this. For example, the thumbnail images are displayed at a size shown in FIG. 4, and the thumbnail images may be displayed on the entire screen. When the thumbnail images cannot be generated, icons and the like representing the image data may be displayed.

Figure 7:
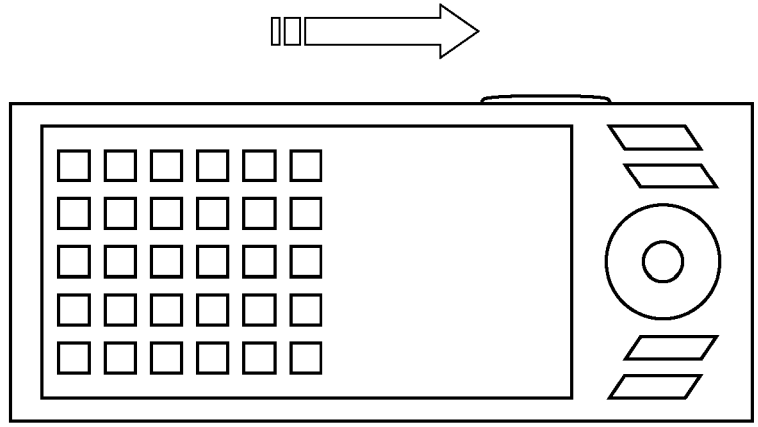
FIG. 7 is a second view showing the outline of processing for adjusting data.

As shown in FIG. 7, the user shakes the apparatus downward. Upon detection of this motion, the information processing apparatus 100 reduces the number of data based on the detected motion. When the number of data is reduced, the state shown in FIG. 8 is obtained. When displaying only the remaining data of the data set, the user cannot grasp the number of reduced data by one shaking operation, thereby impairing operability. For this reason, as indicated by a dotted frame 801 in FIG. 8, the process of reducing the data may be displayed. In this case, the user can recognize the degree of data reduction. For example, if the user wants to increase the number of data to be reduced, he shakes the apparatus with a larger magnitude. To the contrary, if the user wants to decrease the number of data to be reduced, he shakes the apparatus with a smaller magnitude. The method of displaying the data reduction process is not limited to a specific one, but an animation display for dropping data to be reduced may be used, as shown in FIG. 8.

Figure 9B:
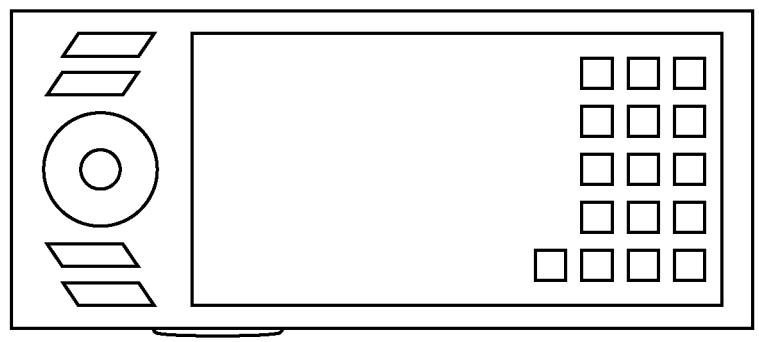
FIGS. 9A and 9B are fourth views showing the outline of processing for adjusting data.
Figure 9A:
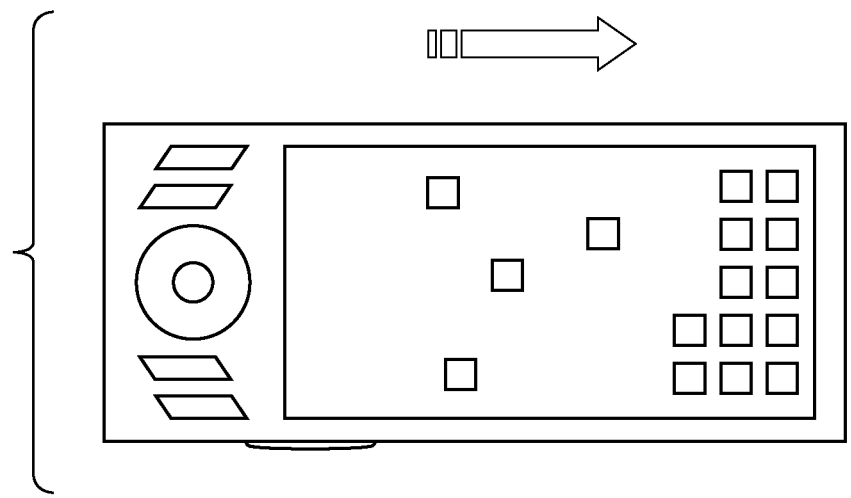

A case in which a data is to be added will be described below. In the above description, when the user shakes the apparatus downward while holding the apparatus in the direction shown in FIG. 7, the number of data is reduced. For example, to add data, the user shakes the apparatus in a direction opposite to the direction shown in FIG. 7. More specifically, as shown in FIG. 9A, the user turns the apparatus upside down and shakes the apparatus downward to increase the number of data. Upon adding the data, the state shown in FIG. 9B is obtained. As described above, assignment of reverse adjustment to a reverse-direction operation allows the user to perform intuitive manipulations, thereby increasing operability. Even if the user excessively reduces the number of data by the operation shown in FIG. 7, he can restore the desired number of data by the operation shown in FIG. 9A.

Adjustment data decision processing in step S506 of FIG. 5 will be described in detail with reference to FIGS. 10 and 11. In this embodiment, two examples as adjustment data decision processing will be explained. More specifically, processing for deleting data from a data set and processing for adding data to a data set will be described below.

An example of the processing sequence for deleting data from a data set will be described with reference to FIG. 10. This processing is executed when an adjustment policy indicating that "the number of data is to be reduced" is decided in step S503 of FIG. 5.

In step S1001, the data set adjustment unit 204 of the information processing apparatus 100 acquires the adjustment amount decided in step S505. That is, the number of data to be deleted is acquired.

In step S1002, the data set adjustment unit 204 of the information processing apparatus 100 determines whether processing for adding data to the data set has already been executed. This determination is performed because data which is increased but has a relatively low association with the data set is preferentially deleted when the processing for adding the data has already been executed. When the data set includes the increased data (to be referred to as addition data hereinafter), the process advances to step S1003; otherwise, the process advances to step S1004.

In step S1003, the data set adjustment unit 204 of the information processing apparatus 100 sets the priority to the addition data as a deletion candidate. The data set adjustment unit 204 can set a degree of priority separately. For example, while the addition data is included in a data set, the addition data may always be deleted from the data set or may be selected as a deletion target with a given priority level. Alternatively, the addition data need not be preferentially deleted.

In step S1004, the data set adjustment unit 204 of the information processing apparatus 100 extracts the feature amount of each data included in the data set. The feature amount for image data includes an overall tint and the position and relationship of an object. Other feature amounts include information about creation date and time and place of data, a user who created data, and an application device (tool).

In step S1005, the data set adjustment unit 204 of the information processing apparatus 100 compares the feature amounts of the data extracted in step S1004 and calculates the similarities between the data.

In step S1006, the data set adjustment unit 204 of the information processing apparatus 100 decides data serving as an adjustment target (in this case, a deletion target) based on the priority set in step S1003 and the similarities calculated in step S1005. The number of data as deletion targets is the number corresponding to the adjustment amount acquired in step S1001. For example, one of the data as a combination of data having a high similarity serves as a deletion target. This is because similar data are not displayed as a plurality of thumbnail data. The user often wants to look at different images rather than similar image data in a slide show. Such a user's intention is assumed, and similar data are preferentially deleted in processing of step S1006. To the contrary, another user may want to browse only similar images. In this case, processing in steps S1004 and S1005 is omitted, and similar data are left undeleted. The user may designate specific data if he wants to leave similar data of the specific data. In addition, the user may arbitrarily select data as deletion candidates in accordance with his instruction depending on his intention and purpose.

An example of a processing sequence for adding data to a data set will be described with reference to FIG. 11. This processing is executed when an adjustment policy for "increasing the number of data" is decided in step S503 of FIG. 5.

In step S1101, the data set adjustment unit 204 of the information processing apparatus 100 acquires the adjustment amount decided in step S505. That is, the unit 204 acquires the number of data to be added.

In step S1102, the data set adjustment unit 204 of the information processing apparatus 100 determines whether processing for deleting data has already been performed for a data set. This determination is performed because if such processing has already been performed, the deleted data relatively highly associated with the data set is preferentially added. When data once deleted is present (to be referred to as a deleted data hereinafter), the process advances to step S1103; otherwise, the process advances to step S1104.

In step S1103, the data set adjustment unit 204 of the information processing apparatus 100 sets the priority to the deleted data so as to preferentially set it as an addition candidate. The unit 204 can set a degree of priority to the deleted data separately. For example, data may be added from this deleted data until all the deleted data are restored to the data set. This deleted data may be selected as an addition target in accordance with a given priority. The deleted data need not be preferentially added.

In step S1104, the data set adjustment unit 204 of the information processing apparatus 100 acquires data serving as an addition target. More specifically, a condition used to generate a data set is moderated, and data similar to the data set is acquired in accordance with the moderated condition. For example, if there are continuous numerical conditions upon generating a data set, the range defined by the conditions is widened. If a condition is designated using a word, the associated words and synonyms of the designated word may be included in the condition. Alternatively, with reference to a concept dictionary, a more abstract word may be added using the conceptual hierarchical relationship of the word designated in the condition. More specifically, assume that a data set uses a condition "year=2007 and event=Christmas". In this case, the condition is extended to last and next years of the current year such that "year=2006 or 2007 or 2008". The condition is extended to events close to the current event such that "event=Christmas or Christmas Eve". The addition data are determined as described above. Data corresponding to the intention at the time of generating the data set can be added. However, no condition may be set at the time of generating the data set or there may be no condition to be moderated or no data serving as a candidate upon extending the condition. In this case, arbitrary data may be acquired. Alternatively, a message indicating that data cannot be increased may be prompted to the user.

In step S1105, the data set adjustment unit 204 of the information processing apparatus 100 determines whether the number of data serving as addition candidates is smaller than the adjustment amount acquired in step S1101. If the number data is equal to or more than the adjustment amount, the process advances to processing in step S1106; otherwise, the process returns to processing in step S1104 again to attempt to further moderate the condition.

In step S1106, the data set adjustment unit 204 of the information processing apparatus 100 extracts the feature amounts of the respective data for the addition candidates and the existing data set. Note that the feature amounts are extracted in the same manner as in step S1004 of FIG. 10.

In step S1107, the data set adjustment unit 204 of the information processing apparatus 100 compares the feature amounts of the data extracted in step S1106 to calculate similarities between the data.

In step S1108, the data set adjustment unit 204 of the information processing apparatus 100 decides data serving as an adjustment target (in this case, an addition target) based on the priority set in step S1103 and the similarity calculated in step S1107. The number of data as addition targets is the number corresponding to the adjustment amount acquired in step S1101. At this time, data having a low similarity to the existing data set is preferentially selected from the addition candidate data, thereby increasing the data absent in the existing data set. Note that the user may want to increase and browse similar images at the time of addition processing like in the deletion processing. In this case, similar data are preferentially increased. More specifically, data are increased from data having a high similarity to the existing data set. Note that the user can designate specific data so as to preferentially increase data similar to the specific data. In addition, the user may arbitrarily select data as addition candidates in accordance with his instruction depending on his intention and purpose.

As described above, according to this embodiment, the user can obtain a desired data set in accordance with his intuitive manipulation, thereby greatly improving operability of the user.

The present invention is not limited to the above embodiment and embodiments exemplified with the accompanying drawings. Various changes and modifications may be made without departing from the spirit and scope of the invention.

For example, in the above description, the user shakes the apparatus to adjust the data set. However, the present invention is not limited to this. For example, the user may strike one side of the apparatus. As shown in FIG. 12, the user may strike the apparatus at one corner with a hand 1201. Alternatively, as shown in FIG. 13, the user strikes one side of the apparatus against a surface 1301 of a desk or the like in a rat-tat-tat manner. In this case, the magnitude of the motion is evaluated using a striking frequency per unit time or the magnitude of an output value of a sensor which senses an impact or sound upon striking.

In the above description, the data adjustment policy is decided in accordance with the direction of the apparatus. However, the present invention is not limited to this. For example, the user may explicitly give an instruction for the data adjustment policy using a button. More specifically, when the user applies the motion to the apparatus while pressing the button, adjustment is made to increase the number of data. To the contrary, when the user applies the motion to the apparatus without pressing the button, adjustment is made to decrease the number of data.

In the above description, the data adjustment policy indicates an "increase" or "decrease". However, the present invention is not limited to this. For example, a data adjustment policy may indicate that data whose amount corresponds to the adjustment amount in the data set may be replaced with another data. In the above description, the method of deciding the adjustment data has been described with reference to FIGS. 10 and 11. The present invention, however, is not limited to this method, either. For example, the user may explicitly designate data serving as an adjustment target. It is effective to explicitly give the instruction for the adjustment target if data to be reduced or some data to be replaced are decided. When data to be reduced is decided, the intended data is not lost. When some data to be replaced are decided, the user need not perform two manipulations, that is, "decrease" and "increase" and can achieve replacement by one manipulation.

In the above description, the adjustment data is decided using the similarity of the feature amount of the data. However, the present invention need not use the similarity. For example, to generate a data set in accordance with a search condition, a search score is used to allow readily selecting data having a high score as an addition target. In this case, the data having a high score can hardly be selected as a deletion target. Alternatively, the data quality may be evaluated. For example, in-focus image data has a higher evaluation level and can be readily selected as an addition target. The data having a higher evaluation level can hardly be selected as the deletion target. These methods can be used in combination, as a matter of course.

In the above description, image data are mainly exemplified. However, the present invention is not limited to this. For example, when the information processing apparatus is a music player, the above embodiment may exemplify play list creation of music data. In this case, the feature amounts may include similarities of music data such as tempo, pitch, lyrics, singer, and genre.

The present invention embodies a system, apparatus, method, program, or computer-readable storage medium. More specifically, the present invention is applicable to a system including a plurality of devices or an apparatus including a single device.

According to the present invention, since a desired data set can be obtained by an intuitive manipulation, user's operability improves.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-297093 filed on Nov. 20, 2008, which is hereby incorporated by reference herein in its entirety.

What is claimed is:

1. An information processing apparatus which executes a variety of processing operations in accordance with a user's operation detected by an operation detection device, comprising:
- a generation unit configured to generate a data set from a data group in accordance with a predetermined condition;
- a direction acquisition unit configured to acquire information representing which surface of the operation detection device is an upper surface, when a predetermined motion is detected by the operation detection device;
- a determination unit configured to determine whether a content of processing corresponding to the predetermined motion is a processing which adds data to the data set or a processing which deletes data from the data set, based on the information acquired by the direction acquisition unit;
- an evaluation unit configured to evaluate a magnitude of the predetermined motion; and
- an adjustment unit configured to perform adjustment of the data set by increasing or decreasing the data included in the data set generated by the generation unit, based on the content of processing determined by the determination unit,
- wherein the determination unit determines that the processing corresponding to the predetermined motion is the processing which deletes data from the data set in a case where the upper surface represented by the information acquired by the direction acquisition unit is a predetermined surface and determines that the processing corresponding to the predetermined motion is the processing which adds data to the data set in a case where the upper surface represented by the information acquired by the direction acquisition unit is a surface opposite to the predetermined surface,
- wherein the adjustment unit performs adjustment so as to add an amount of data determined based on the magnitude evaluated by the evaluation unit to the data set in the case where the result of the determination represents the processing which adds data to the data set, and so as to delete an amount of data from the data set determined based on the magnitude evaluated by the evaluation unit in the case where the result of the determination represents the processing which deletes data from the data set, and wherein, if the result of the determination represents the processing which deletes data from the data set, data displayed closer to the surface opposite to the predetermined surface is deleted prior to data displayed closer to the predetermined surface.

2. The apparatus according to claim 1, wherein the processes by the determination unit and the adjustment unit are repeatedly performed,
wherein when the latest content of processing determined by the determination unit is processing for adding data to the data set, the adjustment unit preferentially adds data already deleted from the data set by the previous adjustment by the number based on the magnitude currently evaluated by the evaluation unit.

3. The apparatus according to claim 1, wherein the adjustment unit preferentially adds data matching a condition associated with the predetermined condition at the time of generating the data set when the content of processing determined by the determination unit is processing for adding data to the data set.

4. The apparatus according to claim 1, wherein the adjustment unit decides data to be added to the data set, based on a similarity with data included in the data set when the content of processing determined by the determination unit is processing for adding data to the data set.

5. The apparatus according to claim 1, wherein the processes by the determination unit and the adjustment unit are repeatedly performed,
wherein when the latest content of processing determined by the determination unit is processing for deleting data from the data set, the adjustment unit preferentially deletes, data already added to the data set by the previous adjustment by the number based on the magnitude currently evaluated by the evaluation unit.

6. The apparatus according to claim 1, wherein the adjustment unit decides data to be deleted from the data set, based on a similarity between data contained in the data set, when the content of processing determined by the determination unit is processing for deleting data from the data set.

7. The apparatus according to claim 1, further comprising an output processing unit configured to output, in a recognizable state, a process of an increasing or decreasing the data included in the data set by the adjustment unit,
wherein the output processing unit displays on a display so that, in a case where the adjustment unit performs adjustment so as to delete an amount of data from the data set, thumbnails of data that is to be deleted fall from the display to the surface opposite to the predetermined surface of the operation detection device, and
wherein the output processing unit displays on a display so that, in a case where the adjustment unit performs adjustment so as to add an amount of data into the data set, thumbnails of data that is to be added fall from the surface opposite to the predetermined surface of the operation detection device to the display.

8. The apparatus according to claim 1, wherein the predetermined motion is one of a shaking motion and a striking motion detected by the operation detection device.

9. A processing method for an information processing apparatus which executes a variety of processing operations in accordance with a user's operation detected by an operation detection device, comprising:
- a generation step of generating a data set from a data group in accordance with a predetermined condition;
- a direction acquisition step of acquiring information representing which surface of the operation detection device is an upper surface, when a predetermined motion is detected by the operation detection device;
- a determination step of determining whether a content of processing corresponding to the predetermined motion is a processing which adds data to the data set or a processing which deletes data from the data set, based on the information acquired in the direction acquisition step;
- an evaluation step of evaluating a magnitude of the predetermined motion; and
- an adjustment step of performing adjustment of the data set by increasing or decreasing the data included in the data set generated in the generation step, based on the content of processing determined in the determination step,
- wherein it is determined in the determination step that the processing corresponding to the predetermined motion is the processing which deletes data from the data set in a case where the upper surface represented by the information acquired in the direction acquisition step is a predetermined surface, and determined that the processing corresponding to the predetermined motion is the processing which adds data to the data set in a case where the upper surface represented by the information acquired in the direction acquisition step is a surface opposite to the predetermined surface, wherein in the adjustment step, adjustment is performed so as to add an amount of data determined based on the magnitude evaluated in the evaluation step to the data set in the case where the result of the determination represents the processing which adds data to the data set, and so as to delete an amount of data from the data set determined based on the magnitude evaluated in the evaluation step in the case where the result of the determination represents the processing which deletes data from the data set, and wherein, if the result of the determination represents the processing which deletes data from the data set, data displayed closer to the surface opposite to the predetermined surface is deleted prior to data displayed closer to the predetermined surface.

10. A non-transitory computer-readable storage medium storing a computer program for causing a computer to execute each step of a processing method for an information processing apparatus according to claim 9.

11. An information processing apparatus which executes a variety of processing operations in accordance with a user's operation detected by an operation detection device, comprising:

a generation unit configured to generate a data set from a data group in accordance with a predetermined condition:

a direction acquisition unit configured to acquire information representing which surface of the operation detection device is an upper surface, when a predetermined motion is detected by the operation detection device;

a determination unit configured to determine whether a content of processing corresponding to the predetermined motion is a processing which adds data to the data set or a processing which deletes data from the data set, based on the information acquired by the direction acquisition unit; and an adjustment unit configured to perform adjustment of the data set by increasing or decreasing the data included in the data set generated by the generation unit, based on the content of processing determined by the determination unit, wherein the determination unit determines that the processing corresponding to the predetermined motion is the processing which deletes data from the data set in a case where the upper surface represented by the information acquired by the direction acquisition unit is a predetermined surface and determines that the processing corresponding to the predetermined motion is the processing which adds data to the data set in a case where the upper surface represented by the information acquired by the direction acquisition unit is a surface opposite to the predetermined surface, wherein, if the result of the determination represents the processing which deletes data from the data set, data displayed closer to the surface opposite to the predetermined surface is deleted prior to data displayed closer to the predetermined surface.

12. A processing method for an information processing apparatus which executes a variety of processing operations in accordance with a user's operation detected by an operation detection device, comprising:

a generation step of generating a data set from a data group in accordance with a predetermined condition;

a direction acquisition step of acquiring information representing which surface of the operation detection device is an upper surface, when a predetermined motion is detected by the operation detection device;

a determination step of determining whether a content of processing corresponding to the predetermined motion is a processing which adds data to the data set or a processing which deletes data from the data set, based on the information acquired in the direction acquisition step; and an adjustment step of performing adjustment of the data set by increasing or decreasing the data included in the data set generated in the generation step, based on the content of processing determined in the determination step, wherein it is determined in the determination step that the processing corresponding to the predetermined motion is the processing which deletes data from the data set in a case where the upper surface represented in by the information acquired in the direction acquisition step is a predetermined surface, and determined that the processing corresponding to the predetermined motion is the processing which adds data to the data set in a case where the upper surface represented by the information acquired in the direction acquisition step is a surface opposite to the predetermined surface, wherein, if the result of the determination represents the processing which deletes data from the data set, data displayed closer to the surface opposite to the predetermined surface is deleted prior to data displayed closer to the predetermined surface.

13. A non-transitory computer-readable storage medium storing a computer program for causing a computer to execute each step of a processing method for an information processing apparatus according to claim 12.

14. The apparatus according to claim 1, wherein the direction acquisition unit performs an acquisition based on whether the operation detection device is turned upside down.

15. The apparatus according to claim 1, wherein the direction acquisition unit acquires information representing which surface of the operation detection device is an upper surface based on an acceleration value which an acceleration sensor detects during a shaking motion of the operation detection device in a predetermined direction.

16. The method according to claim 9, further comprising a step of outputting, in a recognizable state, a process of an increasing or decreasing the data included in the data set in the adjustment step, wherein an output is performed on a display so that, in a case where in the adjustment step adjustment is performed so as to delete an amount of data from the data set, thumbnails of data that is to be deleted fall from the display to the surface opposite to the predetermined surface of the operation detection device, wherein an output is performed on a display so that, in a case where in the adjustment step adjustment is performed so as to add an amount of data into the data set, thumbnails of data that is to be added fall from the surface opposite to the predetermined surface of the operation detection device to the display.

* * * * *